Patented Feb. 12, 1935

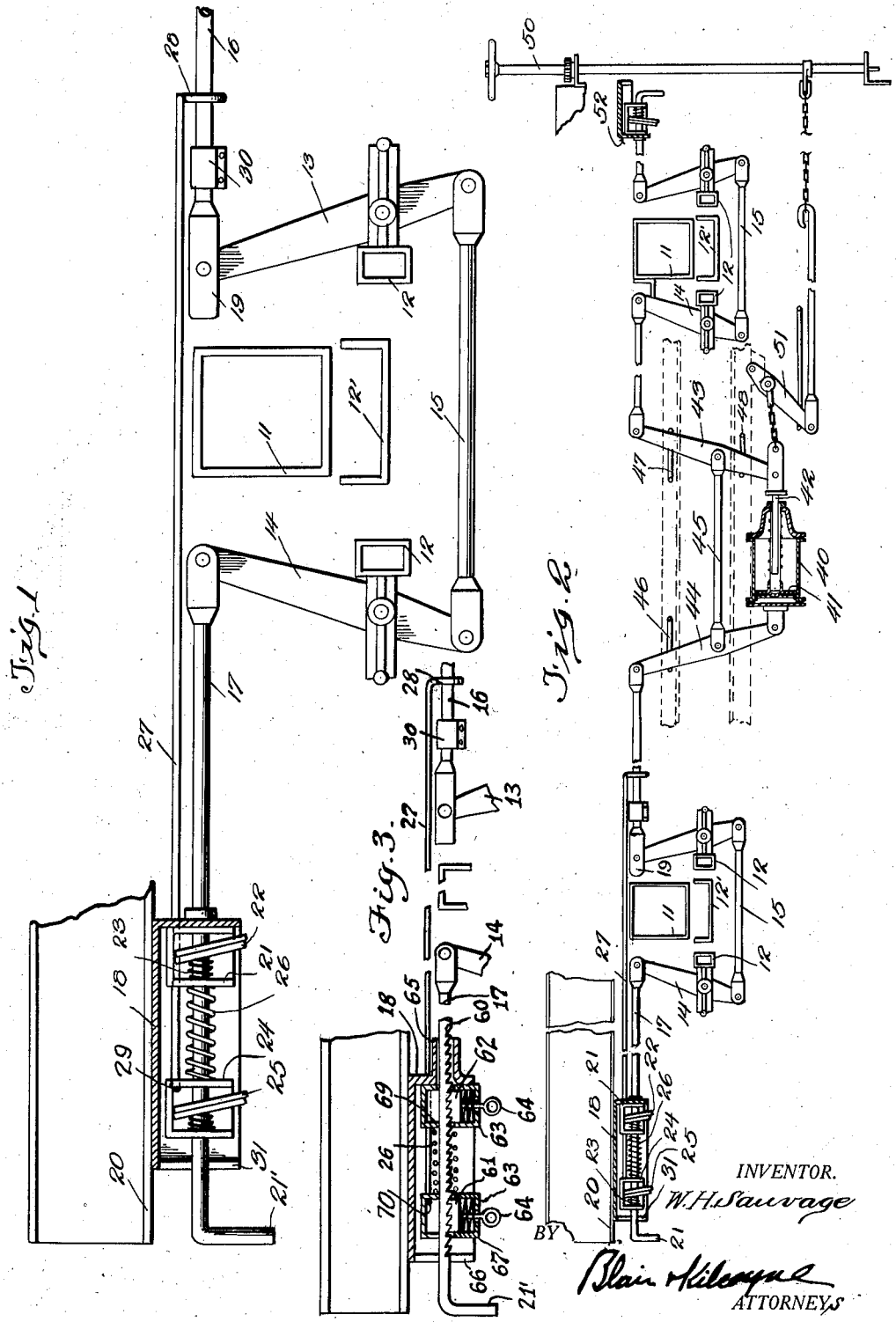

1,991,262

UNITED STATES PATENT OFFICE 1,991,262

REGULATOR FOR BRAKE RIGGING

William H. Sauvage, New York, N. Y., assignor, by mesne assignments, to Royal Railway Improvements Corporation, New York, N. Y., a corporation of Delaware Original application October 14, 1926, Serial No. 141,574. Divided and this application June 10, 1929, Serial No. 369,813. Renewed July 18, 1934

39 Claims. (Cl. 188—199)

This invention relates to improvements in regulators and more particularly to a combined manual and automatic regulator for the brake rigging of railway vehicles, the same being a division of my co-pending application, Ser. No. 141,574, filed October 14, 1926, resulting in Patent 1,738,485, December 3, 1929.

As is well known to those familiar with the prior art relating to the regulation of brake rigging for the purpose of establishing either practically or theoretically the desired predetermined piston travel, as well as the proper brake shoe clearance, mechanical automatic slack adjusters for the most part have been exceedingly unsatisfactory and unreliable in actual commercial use, due primarily to the fact that as variations in the braking applications occur, that is, a normal standing or running application or an emergency application, such will cause a variation in the actuation of the slack adjuster device. Thus, for example, an emergency application in which the air brake piston rod is driven out with great force and speed, exerting a tremendous pressure on the brake shoes, not only will take up all excess travel at the wheels, but also any play whatsoever in the brake rigging. Further, there will be a relative movement of the two trucks of the railway vehicle towards each other; also a relative movement of the axles of the wheels of each truck either towards or from each other depending upon the type of brake rigging, thereby permitting the absorption of a greater amount by the adjuster than would be possible with a normal or standing application of the air brakes. Thus when the brakes are released, the shoes will not drop clear to their predetermined travel, and dragging brake shoes with the consequent dangers thereof will result.

The above, being known to those skilled in this art, has resulted in the adoption of manually actuated regulators to a large extent, in which the human factor or actuating power is substantially constant, whereby the exact excess travel is taken up manually and predetermined piston travel and uniform brake shoe clearance results. The present invention, however, is directed to a combined automatic and manual brake regulator particularly designed to permit not only the manual actuation by the inspector at predetermined intervals, but further to overcome the human error of neglect. Thus, if an inspector fails to manually actuate the regulator at frequent intervals, or if the brake shoes are subjected to extreme wear and the brake shoe clearance becomes abnormal, then the automatic feature of the invention will take care of this abnormal or excess travel to absorb the dangerous abnormal travel and bring the apparatus substantially within safe limits of operation at all times. Therefore, the present invention should not be confused with such automatic devices as shown in my prior Patent, No. 1,618,783, dated February 22, 1927, for example.

A further object of the invention is to provide a mechanism of the last above mentioned character, which may be easily and quickly applied to brake rigging now in general use without material alteration or additions, and which may be easily, quickly, and inexpensively installed and operated on railway cars.

A further object of the invention is to provide a reliable and efficient manually actuated brake regulator, together with automatic features which will permit easy and quick manual adjustment, to accurately position the brake shoes and piston travel, as well as one which may be adjusted for varying conditions, and various types of brake rigging.

Other objects will be in part obvious from the annexed drawing and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawing depicting a preferred form of the invention has been annexed as part of this disclosure, and in such drawing, like characters of reference denote corresponding parts throughout all of the views, in which—

Fig. 1 is a semi-diagrammatic elevational view of a truck brake rigging with the manual and automatic regulator applied thereto;

Fig. 2 is a general diagrammatic plan and elevational view of the entire brake rigging to which the form shown in Fig. 1 may be applied.

Fig. 3 is a detail view showing a modified form of holding means but in the same type of regulator and brake rigging as shown in Figs. 1 and 2.

While the invention will be hereinafter described particularly with relation to its application to truck brake rigging, it is of course to be understood that without material modification and alteration, the mechanism is equally applicable to the cylinder levers of the foundation brake gear which have substantially the same relative movement towards and from each other during braking operation.

Referring now to the drawing in detail and more particularly to Fig. 1, the numeral 11 indicates the truck bolster provided with the usual spring plank 12 therebeneath, and at opposite sides thereof are supported brake beams 12 supporting live and dead truck brake levers 13 and 14 respectively connected at their lower ends by a bottom rod 15. The upper end of the live lever 13 is provided with a pull rod 16 extending rearwardly beyond the end of the top of the live lever, thereby to act as a stop 19 for preventing further relative movement of the pull rod 16 when the manually actuated regulator at the left is operated. This form of stop means is one of various devices which may be employed to limit the movement of the pull rod 16, thereby to prevent a disturbance of the angularity of the remaining levers of the car when the brakes are manually actuated or regulated as by the system shown in Fig. 2.

The opposite or dead lever 14 is provided at its upper end with a connecting member such as a pull rod 17 which extends thru a support or channel member 18, secured in any desired manner to the under side of the car body such as the center sill 20. The end of this rod 17 is provided with an actuating or operating handle 21' whereby it is only necessary for the inspector to grasp this handle 21' and pull the same forcibly towards the left (Fig. 1) at the end of the car to insure absolute predetermined brake shoe clearance, as well as to restore desired standard piston travel.

The regulator in the present case comprises or includes a relatively movable housing 21 provided with one or more holding devices 22 cooperating with the pull rod 17. As herein shown, these holding devices are in the form of grip dogs normally held in canted relation by means of a spring 23 reactively engaging one side and the adjacent end wall of the housing 21. Thus, this holding device will permit a free relative movement of the rod 17 in one direction, but will positively prevent a reverse movement thereof. This type of construction is common and well known in the art, and is believed to require no detailed explanation. It is perhaps preferable over the pawl and ratchet mechanism or shim type of take-up also common in the art in view of its extreme simplicity and accuracy in movement. However, a regulator using a pawl and ratchet mechanism shown in Fig. 3, is described in the parent Patent 1,738,485, page 3, line 51 et seq., and will be hereinafter described.

Mounted upon the same pull rod 17 and within the supporting member 18 is a second housing 24 provided with spring pressed means 25 and spaced from the first housing by a spiral compression spring 26. This second housing 24 is connected by means of a bent-in end 29 of rod 27 provided at its opposite end with an eye or other slip form of engaging device 28 with the pull rod 16, and adjacent this eye 28 but spaced therefrom is an adjustably mounted stop 30. As shown in the present device, when the pull rod handle 21' is actuated towards the left, then both housings 21 and 24 move relatively therewith until they engage inwardly projecting lugs or stops 31 at the end of the channel member 18, that is, the space between the stops 31 and the housing 24 is a distance proportional or equal to total truck brake shoe clearance. If there is any excess travel whatsoever, the rod 17 slips thru both housing 21 and 24 an amount proportional or equal to this excess travel, and the same is permanently taken up by the holding device 22.

In Fig. 2 there is illustrated the complete brake rigging system which not only includes a truck brake rigging at each end of the car as shown in Fig. 1, but also the main foundation brake gear including the air brake cylinder 40 with the customary accessories, a piston 41 and telescopic piston rod 42 therein, the cylinder levers 43, 44 being positioned at the opposite sides thereof and connected by means of a cylinder lever tie rod 45.

Supporting means such as brackets 46, 47 and 48 are of course provided for these cylinder levers primarily for the purpose of accurately positioning or determining their angularity and preventing a disturbance of their angularity when either regulator at either end of the car is manually actuated.

Any desired form of hand brake mechanism may be connected with the other end of the telescopic piston rod 42, thus permitting a manual application of the brakes.

As herein shown, a simple form of power amplifying device such as a lever 51, is interposed between the brake staff 50 and the piston push rod 42.

The pawl and ratchet type of regulator shown in Fig. 3 is substantially the same in construction and operation as that above described, altho the regulating movement is not as accurate as with the form shown in Fig. 1 for the reason that it is necessary to take up the entire distance between two teeth on the ratchet, which may be anywhere from a half inch to a full inch in length. In this form, the top rod 17 is connected to the upper end of one of the levers 14 while the other lever 13 is connected by means of top rod 16 and thence to the cylinder piston in the usual manner. An adjusting rod 27 coacts at one end with this top rod 16 and its eye 28 is spaced from the adjustable stop 30 a predetermined distance in excess of normal brake shoe clearance, and also in excess of the distance between at least two teeth on the ratchet. The opposite end hooks into the member 67 at the point 70.

The housing 18 is rigidly secured to the center sill 20 in the same manner as in Fig. 1, but the top rod 17 is provided with a ratchet surface 60 adapted to be engaged by two pawls 61 and 62, which are normally urged upwardly into engagement with the ratchet surface 60 by springs 63. Both are provided with depending handles 64 as shown in my prior Patent 1,738,485, dated December 3, 1929, whereby they may be released from their engagement with the ratchet to permit a full restoration of the ratchet to initial normal position. The housing 18 is provided with a rigid front wall 65 constituting a fixed stop having an elongated opening thru which the ratchet rod 17 passes, thereby to prevent a catching of the ratchet teeth at either end. The rear wall 66 merely comprises two inwardly extending lugs to prevent a removal of the pawl housings 67 and act as a stop when the device is being manually operated by the handle 21'.

As previously stated, this device is capable of either manual or automatic operation, that is, a pull on the handle 21' in the above described manner will cause the ratchet rod 60 to move relatively towards the left until the housing 67 engages the fixed stop 66, the normal distance between these elements 66—67 being proportional to normal brake shoe clearance. If excess travel exists, the spring 26 is compressed by reason of the relative movement of the housing 67, and thus on release of the regulating force it will expand and cause a relative movement of the right hand housing 69 along the ratchet rod and thereby permanently take up and hold this excess travel.

If the device is actuated automatically on failure of the inspector to operate the device manually with sufficient frequency, then the adjustable stop 30 engages the loop or eye 28 during an application of the brakes and causes the left hand housing 67 to be moved along the ratchet rod to compress the spring 26, the right hand pawl and housing 69 holding the rod 17 against movement by reason of its engagement with the fixed stop or end wall 65. On release of the regulating movement or force, the spring 26 expands to urge the housing 69 to the right to take up and hold permanently the excess travel.

The length of the lost motion between the stop 30 and loop or eye 28 is slightly in excess of the compressibility of the spring 26 and should be slightly under the distance of three ratchet teeth, thus preventing a complete take up of all of the excess travel as might otherwise occur on emergency application. The device is therefore more in the nature of a step by step automatic slack adjuster as distinguished from the "grab all" type, thus overcoming the dangers and objections to automatics heretofore devised, as above explained.

In operation, it is only necessary for the inspector to grasp the handle 21' at one end of the car and forcibly pull the same towards him. This movement will cause the holding device within the supporting bracket 18 secured to the under side of the draft sill 20 to first move a distance proportional to or equal to the normal brake shoe clearance. If, however, any excess travel exists over and above this clearance, then the holding rod 17 will slide through both of the take up devices 21, 24 whereby this excess travel is absorbed.

Of course, any desired form of stop mechanism may be used to prevent the disturbance of the angularity of the remaining levers, but for convenience the end of the pull rod 16 nearest the truck bolster 11 is elongated as at 19 so as to abut the bolster when the regulator is actuated, but it may drop clear therefrom to the position shown in Fig. 1 when the handle 21' is released. The lever guide brackets for the cylinder levers 43, 44 will of course perform the same function if this close proximity of the end of the pull rod 16 to the bolster is found undesirable, as might occur on certain types of railway cars.

It will be noted at this point that the adjustable stop 30 upon this pull rod 16 is located a distance from the eye 28 slightly in excess of the distance between the end of the housing 24 and the stop 31 of the supporting bracket. The purpose of this variable and excess lost motion will appear obvious from the following explanation.

For example, should the inspector neglect to actuate the rod or regulator with reasonable frequency, then the excess travel gradually increases due to wear and when it reaches an amount equal to the distance between the adjustable stop 30 and the eye 28 then or thereafter at each application of the brakes the stop 30 will coact with this eye 28 and move the housing 24 thru action of the rod 27 a distance equal to this further abnormal excess travel. Such movement of the housing 24 causes a compression of the spring 26, and when the brakes are released, this spring will expand and urge the housing 24 with its holding device 25 relatively towards the left. As the dogs 25, however, have a biting engagement with the pull rod 17, then this rod will be moved also relatively towards the left a distance equal to the compression of the spring 26. Such movement will thereby change the relative angularity of the levers 13 and 14, thus partially restoring the brake shoes to proper predetermined clearance.

As stated in the early part of this specification, automatic slack adjusters of the mechanical type will not and cannot accurately determine brake shoe clearance due to variations in the forces exerted on the adjuster by varying braking applications, but by making the lost motion between the adjustable stop 30 and the eye 28 in excess of the normal brake shoe clearance determined by the regulator, there will be little or no danger of all of this slack being absorbed on an emergency brake application. It is believed that a single combined automatic regulator as shown in Fig. 2 is sufficient and for that reason any desired type of manual regulator may be used at the other end of the car as indicated at 52.

From the above, it will be seen that the present invention contemplates a structure which will, first, permit the manual actuation of the brakes to determine accurately the brake shoe clearance and piston travel; second, it will overcome the human element of neglect, inasmuch as abnormal excess travel will be automatically taken care of, thereby preventing dangerous excess travel; third, the abnormal travel provided for by the lost motion device associated with the automatic feature of the invention provides an automatic regulator which will be free from the dangers and objections to automatic slack adjusters heretofore in use.

The invention is of simple and practical construction, and it may be inexpensively applied to railway cars now in use without material alterations or changes, and is well adapted to accomplish, among others, all of the objects and advantages herein set forth.

Without further analysis the foregoing will so fully reveal the gist of this invention that others can by applying current knowledge readily adapt it for various applications without omitting certain features that from the standpoint of the prior art, fairly constitute essential characteristics of the generic or specific aspects of this invention, and therefore such adaptations should and are intended to be comprehended within the meaning and range of equivalency of the following claims.

I claim:

1. In a railway brake rigging, in combination, live and dead levers, a regulator therefor, a manually actuated means for said regulator having a lost motion device associated with said levers, and an automatically actuated means for said regulator associated with said levers having a lost motion device associated therewith, the lost motions of said devices being of unequal length.

2. In a railway brake rigging, in combination, live and dead levers, a regulator therefor, a manually actuated means for said regulator having a lost motion device associated with said levers; and an automatically actuated means for said regulator associated with said levers having a lost motion device associated with the regulator, the length of the latter lost motion being in excess of the lost motion associated with the manual means.

3. In combination, live and dead levers, a regulator therefor, a manual and automatic regulating means directly associated with said levers including permanent take up and holding devices and lost motion devices, the length of the lost motion of one being greater than that of the others.

4. In combination, live and dead brake levers, a regulator therefor, a manual and automatic regulating means directly associated with said levers including permanent take up and holding devices and lost motion devices, the length of the lost motion device of the automatic regulating means being slightly greater than that of the manually actuated regulating means.

5. In combination with the truck levers of a railway car, a regulator therefor a combined manual and automatic regulating means, the manual regulating means being provided with a predetermined lost motion device to insure proper brake shoe clearance and connected with one lever for changing its position and the automatic regulating means being connected with the other lever to be actuated on excess movement thereof.

6. In combination with the live and dead truck levers of a railway car, a regulator therefor a combined manual and automatic regulating means, the manual regulating means being provided with a predetermined lost motion device to insure proper brake shoe clearance and connected with the dead lever for changing its position and the automatic regulating means being connected with the live lever to be actuated on excess movement thereof.

7. In combination with the truck levers of a railway car, a regulator therefor a combined manual and automatic regulating means, the manual regulating means being connected with one lever for changing its position and the automatic regulating means being connected with the other lever to be actuated on excess movement thereof, both of said regulating means including lost motion devices.

8. In combination with the truck levers of a railway car, a regulator therefor a combined manual and automatic regulating means, the manual regulating means being connected with one lever for changing its position and the automatic regulating means being connected with the other lever to be actuated on excess movement thereof, both of said regulating means including lost motion devices, the lost motion of the automatic regulating means being greater than that of the manually actuated regulating means.

9. In combination with the live and dead truck levers of a railway car, a regulator therefor a combined manual and automatic regulating means, the manual regulating means being connected with the dead lever for changing its position and the automatic regulating means being connected with the live lever to be actuated on excess movement thereof, both of said regulating means including lost motion devices, the lost motion of the automatic regulating means being greater than that of the manually actuated regulating means.

10. In combination with the live and dead truck levers of a railway car, a regulator therefor a combined manual and automatic regulating means, the manual regulating means being provided with a predetermined lost motion device to insure proper brake shoe clearance and connected with the dead lever for changing its position and the automatic regulating means being connected with the live lever to be actuated on excess movement thereof, and stop means associated with said brake rigging whereby a manual actuation of the regulator will not disturb the angularity of the remaining levers of the rigging.

11. In combination with the live and dead truck levers of a railway car, a regulator therefor a combined manual and automatic regulating means, the manual regulating means being connected with the dead lever for changing its position and the automatic regulating means being connected with the live lever to be actuated on excess movement thereof, both of said regulators including lost motion devices, and stop means associated with said brake rigging whereby a manual actuation of the regulator will not disturb the angularity of the remaining levers of the rigging.

12. In combination with the truck brake rigging of a railway vehicle including live and dead levers, a support on the car body, a plurality of take up and holding means associated with said support, a rod connected with the dead lever adapted to be engage by said holding means, a second rod connected with and adapted to be moved on excess travel of the live lever and connected with one of said holding devices to cause a movement thereof along said first rod on abnormal excess travel, said first rod having manual operating means and a lost motion movement adapted to insure brake shoe clearance.

13. In combination with the truck brake rigging of a railway vehicle including live and dead levers, a support on the car body, a plurality of take up and holding means associated with said support, a rod connected with and adapted to be moved on excess travel of the live lever connected with one of said holding devices to cause a movement thereof relative to said support on abnormal excess travel, and a manually actuated regulator connected with the dead lever, having a lost motion device associated therewith.

14. In combination with the truck brake rigging of a railway vehicle including live and dead levers, a support on the car body, a plurality of take up and holding means associated with said support, a rod connected with the dead lever adapted to be engaged by said holding means, a second rod connected with and adapted to be moved on excess travel of the live lever and connected with one of said holding means to cause a movement thereof along said first rod on abnormal excess travel, a manually actuated member connected with said first rod, and having a lost motion means associated therewith to insure brake shoe clearance and stop means associated with the brake rigging adapted to prevent a disturbance of the angularity of the remaining levers of the rigging when said manually actuated member is operated.

15. In combination, an air brake cylinder, a cylinder lever adapted to be actuated thereby, a rod leading to the truck brake rigging connected with the outer end of said lever, a regulator including both temporary and permanent take up and holding devices adapted to be actuated on excess travel of the cylinder lever and the rod to which said lever is connected, said regulator including a fixed stop on the car body adapted to be engaged by one of said devices, and a spring separating said devices and adapted to be compressed on excess travel to actuate the other device when the brakes are released.

16. In combination, an air brake cylinder, a cylinder lever adapted to be actuated thereby, a rod leading to the truck brake rigging connected with the outer end of said lever, a regulator including both temporary and permanent take up and holding devices adapted to be actuated on excess travel of the cylinder lever and said rod to which said lever is connected, said regulator including a fixed stop on the car body adapted to be engaged by one of said devices, and a spring separating said devices and adapted to be compressed on excess travel to actuate the other device when the brakes are released, said temporary and permanent holding devices each including a spring actuated means adapted to permit relative movement in one direction only.

17. In combination, a lever of the foundation brake rigging, a rod directly connected with said lever near one end, and a fixed stop rigidly connected to the car body, an automatic slack adjuster for changing the relative position of said lever and rod with respect to the car body, thereby to eliminate excess brake travel including temporary and permanent take up and holding devices, each device comprising a spring actuated member coacting with the rod whereby said device is free to move along the rod in one direction only, a spring interposed between said devices, said spring being adapted to be compressed on excess travel of the lever by movement of one device along said rod during application of the brakes when said device engages said stop and to expand on release of the brakes to move the other of said devices along said rod permanently to take up and hold the excess travel.

18. In combination with the foundation brake rigging of a railway vehicle including an airbrake cylinder, cylinder levers and top rod connections adapted to be actuated thereby, means for taking up excess travel in the foundation brake rigging and associated with one of said top rods and actuated thereby including temporary and permanent take up and holding devices adapted to be actuated on excess travel, a fixed stop mounted directly upon the car frame adapted to be engaged by one of said take up devices, a spring interposed between said devices adapted to be compressed on such excess travel thereby to actuate the other device and move the same relatively along the rod when the brakes are released, said temporary and permanent take up and holding devices each including a spring actuated member adapted to prevent movement of the rod in one direction but freely permit movement of the rod in the opposite direction, and means whereby said take up devices may be actuated manually if and when desired.

19. In combination with the foundation brake rigging of a railway car including an airbrake cylinder, cylinder levers and top rod connections associated with the truck brake rigging adapted to be actuated thereby, means for taking up excess travel in the foundation brake gear and connected with one of said top rods and actuated by excess travel thereof including temporary and permanent take up and holding devices, a fixed stop mounted directly upon the car frame adapted to be engaged by one of said take up devices if and when excess travel exists, a spring interposed between said devices adapted to be compressed on such excess travel thereby to actuate the other holding device and move the same relatively along the rod when the brakes are released to permanently absorb the excess travel.

20. In combination with the foundation brake rigging of a railway car including an airbrake cylinder, cylinder levers and top rod connections adapted to be actuated thereby, means for taking up excess travel in the foundation brake gear and associated with one of said top rods and actuated thereby including temporary and permanent take up and holding devices adapted to be actuated on excess travel of the rigging, a fixed stop mounted directly upon the car frame adapted to be engaged by one of said take up devices if and when excess travel exists, a spring interposed between said devices adapted to be compressed on such excess travel thereby to actuate the other device and move the same relatively along the rod when the brakes are released to permanently absorb the excess travel, and manually actuated means for releasing said holding devices when desired.

21. In combination with the foundation brake rigging of a railway vehicle including an airbrake cylinder, cylinder levers and top rod connections adapted to be actuated thereby, means for taking up excess travel in the foundation brake gear and connected with one of said top rods and actuated thereby including temporary and permanent take up and holding devices adapted to be actuated on such excess travel of the rigging, a fixed stop mounted directly upon the car frame adapted to be engaged by one of said take up devices, a spring interposed between said holding devices adapted to be compressed on such excess travel thereby to actuate the other device and move the same relatively along the rod when the brakes are released, said temporary and permanent take up and holding devices each including a spring actuated member adapted to prevent movement of the rod in one direction but freely permit movement of the rod in the opposite direction.

22. In combination with the foundation brake rigging of a railway car including an airbrake cylinder, cylinder levers and top rod connections adapted to be actuated thereby, means for taking up excess travel in the foundation brake rigging adapted to be actuated either manually or automatically and connected with one of said top rods to be actuated thereby, said means including a ratchet and temporary and permanent take up and holding pawls adapted to coact with said ratchet and be actuated on excess travel of the rigging, a fixed member mounted directly on the car frame adapted to be engaged by one of said pawl devices when excess travel exists, a spring interposed between said pawls adapted to be compressed on such excess travel, thereby to actuate the other pawl and move the same relatively with respect to the ratchet when the brakes are released, and spring means for holding the said pawls in engagement with the ratchet whereby a movement of the rod in the opposite direction is positively prevented until the pawls are released, and means whereby said pawls may be moved out of engagement with the ratchet rod when desired.

23. In combination with the foundation brake rigging of a railway vehicle including an airbrake cylinder and cylinder levers, top rod connections adapted to be actuated by said cylinder lever and means adapted to be actuated either manually or automatically for taking up excess travel in the foundation brake rigging associated with said top rods, said means including a ratchet, two spring actuated pawls normally held in engagement with said ratchet and capable of free relative movement with respect to said ratchet in one direction only as well as relatively towards and from each other, spring means separating said pawls, and stop means adapted to function on excess travel thereby to cause a relative movement of one of said pawl devices along the ratchet rod to compress the spring, said spring on release of the brakes and after compression adapted to expand and cause a corresponding movement of the other pawl relatively along said ratchet, thereby permanently to take up and hold the excess travel.

24. In combination with the foundation brake rigging of a railway vehicle including an airbrake cylinder and cylinder levers, top rod connections adapted to be actuated by said cylinder lever and means adapted to be actuated either manually or automatically for taking up excess travel in the foundation brake rigging associated with said top rods, said means including a ratchet on said rod, two spring actuated pawls normally held in engagement with said ratchet and capable of free relative movement with respect to said ratchet in one direction only, a spring separating said pawls, and stop means adapted to function on excess travel to cause a relative movement of one of said pawl devices along the ratchet to compress the spring which, on release of the brakes, expands and causes a corresponding movement of the other pawl relatively along said ratchet to permanently take up and hold the excess travel, and means whereby said pawls may be moved out of engagement with said ratchet rod as when restoring the ratchet to its original position.

25. In combination with the foundation brake rigging of a railway vehicle including an airbrake cylinder, oppositely disposed cylinder levers and top rod connections leading from said cylinder levers to the truck brake rigging, two means associated with each top rod connection adapted to be actuated either automatically or manually thereby to absorb and hold excess travel in the brake rigging, said means each including a ratchet, two sets of pawls coacting with said ratchets, and stop means adapted to function on excess travel of the top rods to move one of said pawls along its ratchet surface, a spring between said pawls adapted to be compressed when said pawl is moved thereby to move the other pawl as the spring expands on release of the brakes.

26. In combination with the foundation brake rigging of a railway vehicle including an airbrake cylinder, oppositely disposed cylinder levers and top rod connections leading from said cylinder levers to the truck brake rigging, regulating means associated with each top rod connection adapted to be actuated either automatically or manually to absorb and hold excess travel in the brake rigging, each regulating means including a ratchet surface, two sets of pawls coacting with each of said ratchet surfaces, and stop means adapted to function on excess travel of either top rod to move one of said pawls of its associated set along the ratchet surface, a spring between said pawls adapted to be compressed when said pawl is moved thereby to move the other pawl as the spring expands on release of the brakes, and manually actuated means for moving the pawls out of engagement with the respective ratchet surfaces to permit the ratchet surfaces to be restored to their original relative position.

27. In combination with the foundation brake rigging of a railway car including an airbrake cylinder, cylinder levers and top rod connections adapted to be actuated thereby, manually or automatically actuated means for taking up excess travel of the foundation brake rigging associated with one of said top rods and adapted to be actuated thereby if and when excess travel exists, including temporary and permanent take up and holding devices, a stop device adapted to function on excess travel of the top rod and thereby to move one of said holding devices, a spring interposed between said holding device and the other holding device adapted to be compressed on said excess travel, thereby to move the other holding device on expanding after the brakes are released, said temporary and permanent take up and holding devices each including a spring actuated member adapted to prevent movement of the part with which it is directly associated in one direction but freely permit movement of the said part in the opposite direction.

28. In combination with the foundation brake rigging of a railway car including an airbrake cylinder, cylinder levers and top rod connections adapted to be actuated thereby, manually or automatically actuated means for taking up excess travel of the foundation brake rigging associated with one of said top rods and adapted to be actuated thereby if and when excess travel exists, including temporary and permanent take up and holding devices, a stop device adapted to function on excess travel of the top rod and thereby to move one of said holding devices, a spring interposed between said holding device and the other holding device adapted to be compressed on excess travel, thereby to move the other holding device on expanding after the brakes are released, said temporary and permanent take up and holding devices each including a spring actuated member adapted to prevent movement of the part with which it is directly associated in one direction but freely permit movement of the said part in the opposite direction, and manually actuating means for releasing said holding device when it is desired to restore the parts to normal position.

29. In a foundation brake gear, a lever, a top rod attached at one end thereof, a fixed stop mounted on the car body, a ratchet associated with the top rod, two pawls with housings therefor engaging said ratchet, spring means urging said pawls into engagement with the ratchet, a spring between the housings, one of said pawl housings adapted to engage with said fixed stop during the regulating operation and cause a compression of said spring thereby to move said other housing when said regulating movement on said rod is released.

30. In combination with the lever of a foundation brake gear, a top rod secured to one end of said lever having a ratchet surface, a fixed stop mounted on the car body, two spring actuated pawls cooperating with said ratchet and spaced apart relative to each other, a compression spring between said pawls adapted to be compressed when one of said housings engages said fixed stop during a regulating movement, thereby to expand and move the other pawl when the regulating force is released.

31. In combination with the lever of a foundation brake gear, a top rod connected with one end of said lever, two holding devices coacting with said rod adapted to permit movement of the rod in one direction and normally to prevent movement thereof in the opposite direction, a fixed stop on the car body adapted to be engaged by one of said holding devices during the regulating movement, a spring between said holding devices adapted to be compressed on excess travel, thereby to move the other holding device on release of the regulating movement permanently to take up and hold the excess travel, and a lost motion means associated with one of said parts whereby brake shoe clearance is insured.

32. In combination with the lever of a foundation brake gear, a top rod connected with one end of said lever, two holding devices coacting with said rod adapted to permit movement of the rod in one direction and normally to prevent movement thereof in the opposite direction, a fixed stop on the car body adapted to be engaged by one of said holding devices during the regulating movement, a spring between said holding devices adapted to be compressed on excess travel, thereby to move the other holding device on release of the regulating movement permanently to take up and hold the excess travel, lost motion means associated with one of said parts whereby brake shoe clearance is insured, and means for releasing said holding devices whereby the rod may be returned to original full release position.

33. In combination with the lever of a foundation brake gear, a top rod connected with one end of said lever, two holding devices coacting with said rod adapted to permit movement of the rod in one direction and normally to prevent movement thereof in the opposite direction, a fixed stop on the car body adapted to be engaged by one of said holding devices during the regulating movement, a spring between said holding devices adapted to be compressed on excess travel, thereby to move the other holding device on release of the regulating movement permanently to take up and hold the excess travel, and a lost motion means associated with one of said parts whereby brake shoe clearance is insured, said lost motion device being greater than the compressibility of the spring thereby to prevent a complete absorption of all excess travel on emergency application.

34. In combination with the lever of the foundation brake gear, a top rod connected to said lever, a fixed stop mounted upon the car body, two holding devices associated with said top rod, one of which is adapted to engage said fixed stop during the regulating operation, a lost motion device associated with one of said parts adapted normally to insure brake shoe clearance, a spring interposed between said holding devices adapted to be compressed on excess travel in excess of the lost motion device and to expand on release of the regulating movement to move the other of said holding devices along said rod.

35. In combination with the lever of the foundation brake gear, a top rod connected to said lever, a fixed stop mounted upon the car body, two holding devices associated with said top rod, one of which is adapted to engage said fixed stop during the regulating operation, a lost motion device associated with one of said parts adapted normally to insure brake shoe clearance, a spring interposed between said holding devices adapted to be compressed on excess travel in excess of the lost motion device and to expand on release of the regulating movement to move the other of said holding devices along said rod, and means for releasing said holding devices to permit a full return of said top rod to original normal position.

36. In combination with the lever of the foundation brake gear, a top rod connected to said lever, a fixed stop mounted upon the car body, two holding devices associated with said top rod, one of which is adapted to engage said fixed stop during the regulating operation, a lost motion device associated with one of said parts adapted normally to insure brake shoe clearance, a spring interposed between said holding devices adapted to be compressed on excess travel in excess of the lost motion device and to expand on release of the regulating movement to move the other of said holding devices along said rod, said holding devices comprising spring actuated pawls.

37. In combination with the lever of the foundation brake gear, a top rod connected to said lever, a fixed stop mounted upon the car body, two holding devices associated with said top rod, one of which is adapted to engage said fixed stop during the regulating operation, a lost motion device associated with one of said parts adapted normally to insure brake shoe clearance, a spring interposed between said holding devices adapted to be compressed on excess travel in excess of the lost motion device and to expand on release of the regulating movement to move the other of said holding devices along said rod, said holding devices comprising spring actuated pawls, and means for releasing said holding devices to permit a full return of said top rod to original normal position, said releasing means including handles extending from said pawls.

38. In combination with the truck levers of a railway car, a regulator therefor comprising a combined manual and automatic regulating means, each being provided with a lost motion device for insuring brake shoe clearance, the lost motion device of the automatic means being greater than the lost motion device of the manual means, and means associated with one of the truck levers for maintaining this ratio of difference in lost motion devices.

39. In combination with the truck levers of a railway car, a regulator therefor comprising a combined manual and automatic regulating means, each being provided with a lost motion device for insuring brake shoe clearance, the lost motion device of the automatic means being greater than the lost motion device of the manual means, and means associated with one of the truck levers for maintaining this ratio of difference in lost motion devices, said means comprising a stop device associated with the dead truck lever.

WILLIAM H. SAUVAGE.